United States Patent
Hayworth et al.

(10) Patent No.: US 10,528,547 B2
(45) Date of Patent: Jan. 7, 2020

(54) TRANSFERRING FILES

(71) Applicant: Microsoft Technology Licensing, LLC, Redmond, WA (US)

(72) Inventors: Christopher Robert Hayworth, Martinez, CA (US); Dachuan Zhang, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 773 days.

(21) Appl. No.: 15/081,111

(22) Filed: Mar. 25, 2016

(65) Prior Publication Data

US 2017/0139978 A1 May 18, 2017

Related U.S. Application Data

(60) Provisional application No. 62/254,989, filed on Nov. 13, 2015.

(51) Int. Cl.
*G06F 16/23* (2019.01)
*G06F 16/22* (2019.01)
*G06F 11/10* (2006.01)

(52) U.S. Cl.
CPC ...... *G06F 16/2365* (2019.01); *G06F 11/1004* (2013.01); *G06F 16/2255* (2019.01); *G06F 16/23* (2019.01)

(58) Field of Classification Search
USPC .............................................. 707/693, 736
See application file for complete search history.

(56) References Cited

U.S. PATENT DOCUMENTS

| | | | |
|---|---|---|---|
| 5,499,366 A | 3/1996 | Rosenberg et al. |
| 5,909,689 A | 6/1999 | Ryzin |
| 6,035,323 A | 3/2000 | Narayen et al. |
| 6,081,262 A | 6/2000 | Gill et al. |

(Continued)

FOREIGN PATENT DOCUMENTS

| | | |
|---|---|---|
| CN | 1828587 | 9/2006 |
| CN | 102945226 | 2/2013 |

(Continued)

OTHER PUBLICATIONS

Chinese Office Action dated Nov. 16, 2017 cited in Application No. 201480036154.4, 10 pgs.

(Continued)

*Primary Examiner* — Cam Linh T Nguyen

(57) ABSTRACT

Systems, components, devices, and methods for transferring files are provided. An example file is a container file comprising a plurality of component files. A non-limiting example method is a method for transferring a container file over a network to a remote device. The method includes the step of accessing a container file, the container file comprising a plurality of components. The method also includes the step of transmitting metadata information for the plurality of components to the remote device. The method further includes the step of determining components from the plurality of components to transmit to the remote device. The method additionally includes the step of transmitting component data items for the determined components to the remote device.

20 Claims, 10 Drawing Sheets

(56) References Cited

U.S. PATENT DOCUMENTS

| | | | |
|---|---|---|---|
| 6,192,518 B1* | 2/2001 | Neal | G06F 8/658 |
| | | | 717/175 |
| 6,983,068 B2 | 1/2006 | Prabhakar et al. | |
| 7,039,229 B2 | 5/2006 | Lin et al. | |
| 7,171,042 B2 | 1/2007 | Hartmann et al. | |
| 7,194,134 B2 | 3/2007 | Bradshaw | |
| 7,346,627 B2* | 3/2008 | Ramanathan | G06F 8/61 |
| | | | 707/616 |
| 7,383,509 B2 | 6/2008 | Foote et al. | |
| 7,386,791 B2 | 6/2008 | Jacobson | |
| 7,500,194 B2 | 3/2009 | Collins et al. | |
| 7,577,905 B2 | 8/2009 | Collins et al. | |
| 7,620,665 B1* | 11/2009 | George | G06F 17/303 |
| 7,716,332 B1 | 5/2010 | Topfl | |
| 7,860,305 B2 | 12/2010 | Wang et al. | |
| 8,024,658 B1 | 9/2011 | Fagans et al. | |
| 8,214,742 B2 | 7/2012 | Pratt | |
| 8,416,255 B1 | 4/2013 | Gilra | |
| 8,418,059 B2 | 4/2013 | Kitada | |
| 8,478,799 B2* | 7/2013 | Beaverson | G06F 17/30097 |
| | | | 707/823 |
| 8,560,952 B2 | 10/2013 | Collins et al. | |
| 8,655,111 B2 | 2/2014 | Berger et al. | |
| 8,745,158 B2 | 6/2014 | Claman | |
| 8,775,918 B2 | 7/2014 | Livshin et al. | |
| 8,799,829 B2 | 8/2014 | Grosz et al. | |
| 8,890,886 B2 | 11/2014 | Kriese et al. | |
| 8,924,376 B1 | 12/2014 | Lee | |
| 9,177,225 B1 | 11/2015 | Cordova | |
| 9,280,613 B2* | 3/2016 | Smith | H04L 63/08 |
| 9,330,437 B2 | 5/2016 | Berglund et al. | |
| 9,400,610 B1* | 7/2016 | Wallace | G06F 3/0652 |
| 9,400,801 B1* | 7/2016 | Aplemakh | G06F 16/1824 |
| 9,715,485 B2 | 7/2017 | Roth et al. | |
| 9,824,291 B2 | 11/2017 | Maloney et al. | |
| 2002/0102018 A1 | 8/2002 | Lin et al. | |
| 2002/0186236 A1 | 12/2002 | Brown et al. | |
| 2002/0194227 A1 | 12/2002 | Day et al. | |
| 2003/0037010 A1* | 2/2003 | Schmelzer | G06F 17/30026 |
| | | | 705/67 |
| 2004/0001106 A1 | 1/2004 | Deutscher et al. | |
| 2004/0034829 A1 | 2/2004 | Ohashi et al. | |
| 2004/0243930 A1 | 12/2004 | Schowtka et al. | |
| 2005/0100223 A1 | 5/2005 | de Queiroz | |
| 2005/0108619 A1 | 5/2005 | Theall et al. | |
| 2005/0171758 A1 | 8/2005 | Palmquist | |
| 2006/0036965 A1 | 2/2006 | Harris et al. | |
| 2006/0126932 A1 | 6/2006 | Eschbach | |
| 2006/0136520 A1* | 6/2006 | Leppinen | H04W 99/00 |
| 2006/0136827 A1 | 6/2006 | Villaron et al. | |
| 2006/0156218 A1 | 7/2006 | Lee | |
| 2006/0220983 A1 | 10/2006 | Isomura et al. | |
| 2006/0259858 A1 | 11/2006 | Collins et al. | |
| 2006/0282779 A1 | 12/2006 | Collins et al. | |
| 2006/0294046 A1 | 12/2006 | Sareen et al. | |
| 2007/0019924 A1 | 1/2007 | Teo et al. | |
| 2007/0185926 A1* | 8/2007 | Prahlad | G06F 17/30997 |
| 2007/0196013 A1 | 8/2007 | Li et al. | |
| 2007/0198523 A1 | 8/2007 | Hayim | |
| 2007/0291049 A1 | 12/2007 | Edwards et al. | |
| 2008/0005195 A1* | 1/2008 | Li | G06F 16/1837 |
| 2008/0075360 A1 | 3/2008 | Li et al. | |
| 2008/0276176 A1 | 11/2008 | Wahba et al. | |
| 2009/0049064 A1 | 2/2009 | Alquier et al. | |
| 2009/0051826 A1 | 2/2009 | Chang | |
| 2009/0077261 A1 | 3/2009 | Broadhurst et al. | |
| 2009/0116752 A1 | 5/2009 | Isomura et al. | |
| 2009/0252413 A1 | 10/2009 | Hua et al. | |
| 2010/0082672 A1* | 4/2010 | Kottomtharayil | G06F 11/1451 |
| | | | 707/770 |
| 2010/0082713 A1* | 4/2010 | Frid-Nielsen | G06F 17/301 |
| | | | 707/821 |
| 2010/0088297 A1* | 4/2010 | Kiilerich | H04L 67/06 |
| | | | 707/705 |
| 2010/0088605 A1 | 4/2010 | Livshin et al. | |
| 2010/0092076 A1 | 4/2010 | Iofis | |
| 2010/0158380 A1 | 6/2010 | Neville et al. | |
| 2010/0289818 A1 | 11/2010 | Hirooka | |
| 2010/0332401 A1* | 12/2010 | Prahlad | G06F 17/30082 |
| | | | 705/80 |
| 2011/0058736 A1 | 3/2011 | Tokungaga | |
| 2011/0125722 A1 | 5/2011 | Rae Goutham et al. | |
| 2011/0131341 A1 | 6/2011 | Yoo et al. | |
| 2011/0157221 A1 | 6/2011 | Ptucha et al. | |
| 2011/0221764 A1 | 9/2011 | Callens et al. | |
| 2011/0234613 A1 | 9/2011 | Hanson | |
| 2011/0243453 A1 | 10/2011 | Kashima et al. | |
| 2011/0246893 A1 | 10/2011 | Paas et al. | |
| 2011/0280476 A1 | 11/2011 | Berger et al. | |
| 2012/0105467 A1 | 5/2012 | Chao et al. | |
| 2012/0106859 A1 | 5/2012 | Cheatle | |
| 2012/0275704 A1 | 11/2012 | Cok et al. | |
| 2013/0028521 A1 | 1/2013 | Yabu | |
| 2013/0111373 A1 | 5/2013 | Kawanishi et al. | |
| 2013/0124980 A1 | 5/2013 | Hudson et al. | |
| 2013/0239002 A1 | 9/2013 | Maloney et al. | |
| 2013/0279773 A1 | 10/2013 | Masumoto | |
| 2014/0195575 A1* | 7/2014 | Haustein | G06F 17/3015 |
| | | | 707/827 |
| 2014/0282009 A1 | 9/2014 | Avrahami | |
| 2014/0380171 A1 | 12/2014 | Maloney et al. | |
| 2015/0046791 A1 | 2/2015 | Isaacson | |
| 2015/0095385 A1 | 4/2015 | Mensch et al. | |
| 2015/0113411 A1 | 4/2015 | Underwood et al. | |
| 2015/0277726 A1 | 10/2015 | Maloney et al. | |
| 2015/0310124 A1 | 10/2015 | Ben-Aharon et al. | |
| 2016/0171954 A1 | 6/2016 | Guo | |
| 2016/0179826 A1* | 6/2016 | Batra | H04L 67/1097 |
| | | | 707/756 |
| 2017/0026552 A1 | 1/2017 | Tomono | |
| 2017/0139930 A1 | 5/2017 | Maloney | |
| 2017/0140241 A1 | 5/2017 | Maloney et al. | |
| 2017/0140250 A1 | 5/2017 | Maloney et al. | |
| 2018/0217742 A1 | 8/2018 | Maloney et al. | |

FOREIGN PATENT DOCUMENTS

| | | |
|---|---|---|
| EP | 1085464 A2 | 3/2001 |
| EP | 1657648 A2 | 5/2006 |
| EP | 2503759 A1 | 9/2012 |
| EP | 3119062 A1 | 1/2017 |
| WO | 1995019003 | 7/1995 |
| WO | 2001093563 A2 | 12/2001 |
| WO | 2006123328 A1 | 11/2006 |
| WO | 2006126628 A1 | 11/2006 |
| WO | 2009085526 A1 | 7/2009 |
| WO | 2012047253 A3 | 4/2012 |
| WO | 2013059545 A1 | 4/2013 |
| WO | 2014015081 A2 | 1/2014 |
| WO | 2014131194 A1 | 9/2014 |

OTHER PUBLICATIONS

PCT 2nd Written Opinion dated Jul. 31, 2017 cited in Application No. PCT/US2016/060416, 11 pgs.

"Final Office Action Issued in U.S. Appl. No. 15/081,351", dated Jun. 28, 2018, 15 Pages.

"Second Office Action Issued in Chinese Patent Application No. 201480036154.4", dated Jul. 16, 2018, 6 Pages.

"Create a slide layout that meets your needs", Retrieved on: Oct. 28, 2015, Available at:https://support.office.com/en-us/article/Create-a-slide-layout-that-meets-your-needs-f881f3a5-522b-4ff8-a496-10a74771a14c, 2 pgs.

Abela, "Announcing the Slide Chooser", Published on: Jan. 14, 2015, 4 pgs., available at: http://extremepresentation.typepad.com/blog/2015/01/announcing-the-slide-chooser.html.

Athitsos et al., "Distinguishing Photographs and Graphics on the World Wide Web", In Proceedings of IEEE Workshop on Content-Based Access of Image and Video Libraries, Jun. 20, 1997, pp. 1-7.

Behera et al., "Combing Color and Layout Features for the Identification of Low-resolution Documents", Google, Mar. 2005, 8 pgs.

(56) References Cited

OTHER PUBLICATIONS

Chen et al., "Artistic Image Analysis using the Composition of Human Figures", In Proceedings of European Conference on Computer Vision, Sep. 6, 2014, pp. 1-15.
Chen et al., "Identifying Computer Graphics Using HSV Color Model and Statistical Moments of Characteristic Functions", In Proceedings of IEEE International Conference on Multimedia and Expo, Jul. 2, 2007, 4 pgs.
Deng et al., "Color Image Segmentation", In Proceedings of Conference on Computer Vision and Pattern Recognition, vol. 2, Jun. 23, 1999, 6 pgs.
Dogar et al., "Ditto—A System for Opportunistic Caching in Multi-hop Wireless Networks", In Proceedings of the 14th ACM International Conference on Mobile Computing and Networking, Sep. 14, 2008, 12 pgs.
Krinidis et al., "An Unsupervised Image Clustering Method Based on EEMD Image Histogram", In Journal of Information Hiding and Multimedia Signal Processing, vol. 3, No. 2, Apr. 2012, pp. 151-163.
Luo et al., "Natural Scene Classification using Overcomplete ICA", In Journal of Pattern Recognition, vol. 38, No. 10, Oct. 2005, pp. 1507-1519.
Morse et al., "Image-based Color Schemes", In Proceedings of IEEE International Conference on Image Processing, vol. 3, Sep. 16, 2007, pp. 497-500.
Muthitacharoen et al., "A Low-bandwidth Network File System", In Proceedings of Eighteenth ACM Symposium on Operating Systems Principles, Oct. 21, 2004, 14 pgs.
Ng et al., "Classifying Photographic and Photorealistic Computer Graphic Images using Natural Image Statistics", In Advent Technical Report #220-2006-6, Oct. 2004, pp. 1-20.
Park et al., "Supporting Practical Content-Addressable Caching with CZIP Compression", In Proceedings of USENIX Annual Technical Conference, Jun. 17, 2007, 24 pgs.
Prabhakar et al., "Picture-Graphics Color Image Classification", In Proceedings of International Conference on Image Processing, vol. 2, Sep. 22, 2002, 5 pgs.
Tridgell et al., "The Rsync Algorithm", In Technical Report TR-CS-96-05 of the Australian National Unversity, Jun. 18, 1996, 8 pgs.
PCT International Search Report dated Feb. 1, 2017 cited in Application No. PCT/US2016/060424, 13 pgs.
PCT International Search Report dated Feb. 8, 2017 cited in Application No. PCT/US2016/060498, 11 pgs.
PCT International Search Report and Written Opinion dated Mar. 2, 2017 cited in Application No. PCT/US2016/060414, 13 pgs.
PCT International Search Report and Written Opinion dated Mar. 2, 2017 cited in Application No. PCT/US2016/060416, 23 pgs.
U.S. Final Office Action dated Oct. 12, 2016 cited in U.S. Appl. No. 13/925,114, 18 pgs.
U.S. Office Action dated Mar. 10, 2017 cited in U.S. Appl. No. 15/081,416, 14 pgs.
PCT Written Opinion dated Sep. 11, 2017 cited in Application No. PCT/US2016/060414, 8 pgs.
PCT International Preliminary Report dated Sep. 22, 2017 cited in Application No. PCT/US2016/060424, 14 pgs
US Office Action dated Oct. 19, 2017 cited in U.S. Appl. No. 15/081,351, 33 pgs.
International Preliminary Report on Patentability dated Sep. 28, 2017 cited in Application No. PCT/US2016/060498, 7 pgs.
International Preliminary Report on Patentability dated Oct. 18, 2017 cited in Application No. PCT/US2016/060416, 12 pgs.
About layouts, Retrieved on: Mar. 26, 2013, Available at: http://office.microsoft.com/en-in/powerpoint-help/about-layouts-HP003082915.aspx.
Leading the way in Microsoft Office Development, Retrieved on: Mar. 26, 2013,Available at: http:/www.bettersolutions.com/powerpoint/PIZ113/YU112210331.htm.
PCT International Preliminary Report on Patentability Issued in PCT Application No. PCT/US2014/041025, dated Oct. 7, 2015, 8 Pages.
PCT International Search Report dated Nov. 26, 2014 in Application No. PCT/US2014/041025, 9 pgs.
PCT Second Written Opinion Issued in Patent Application No. PCT/US2014/041025, dated Jun. 5, 2015, 7 Pages.
U.S. Appl. No. 11/152,755 Notice of Allowance dated Jun. 8, 2009 8 pgs.
U.S. Appl. No. 11/152,755 Office Action dated Sep. 4, 2008 7 pgs.
U.S. Appl. No. 11/152,755 Response dated Feb. 4, 2009 8 pgs.
U.S. Appl. No. 13/925,114 Office Action dated Mar. 10, 2016 7 pgs.
U.S. Appl. No. 13/925,114 Amendment dated Jul. 11, 2016 12 pgs.
International Preliminary Report on Patentability Issued in PCT Application No. PCT/US2016/060414, dated Jan. 4, 2018, 9 Pages.
"Non-Final Office Action Issued in U.S. Appl. No. 15/081,270", dated Nov. 29, 2018, 14 Pages.
"Non Final Office Action Issued in U.S. Appl. No. 15/850,191", dated Jun. 28, 2019, 9 Pages.
"Office Action Issued in European Patent Application No. 14735771.9", dated Mar. 20, 2019, 9 Pages.
"Final Office Action Issued in U.S. Appl. No. 15/081,270", dated May 6, 2019, 12 Pages.
"Notice of Allowance Issued in U.S. Appl. No. 15/081,270", dated Jul. 29, 2019, 9 Pages.

* cited by examiner

MOBILE COMPUTING DEVICE

TRANSFERRING FILES

CROSS-REFERENCE TO RELATED APPLICATIONS

This application claims priority to U.S. Provisional Application Ser. No. 62/254,989, entitled "TRANSFERRING FILES," filed on Nov. 13, 2015, the entire disclosure of which is hereby incorporated herein by reference.

BACKGROUND

File editors are used to create new files and to edit existing files. There are various types of file editors to edit various file types. For example, text editors are used to edit text files, which may consist of a string of characters. Other types of editors may be used to edit more complex file types. As examples, a document editor such as WORD from Microsoft Corporation of Redmond, Wash. is used to edit document files; a presentation editor such as POWERPOINT®, also from Microsoft Corporation, is used to edit presentation files; and a spreadsheet editor such as EXCEL®, also from Microsoft Corporation, is used to edit spreadsheet files. These more complex files types may include a plurality of portions comprising character data, including markup information, and binary data. For example, the markup information may include extensible markup language (XML) tags and data or other markup language data. The binary data may include graphic, image, video, sound, animation, and other types of data. The above are, of course, just examples, and many other types of file editors are used to edit other file types as well. Some of the more complex files may be structured as container files. A container file may include one or more sub-components, such as component files. Examples of container file formats include archive file formats such as zip files (.ZIP) and Java Archive files (.JAR).

Files that are edited with a file editor may be transmitted to a remote computing device such as a server. For example, the remote computing device may be available over a network such as a local area network, a virtual private network, or a wide area network, including the Internet. Transmitting files may require transmission of a large amount of data over the network, which may be problematic. For example, the transmission may be time consuming, especially when the file editor is running on a computing device that is subject to network bandwidth restrictions such as a mobile computing device. The transmission of a larger file may also consume a significant amount of power, thus depleting a battery in a mobile device. Additionally, transmission of larger file may increase security and data corruption risks.

It is with respect to these and other general considerations that aspects have been made. Also, although relatively specific problems have been discussed, it should be understood that the aspects should not be limited to solving the specific problems identified in the background.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects of the present disclosure provide a method and system for transferring files. In an example, a container file is transferred in a manner that reduces the amount of data that must be transmitted over the network. A non-limiting example method is a method for transferring a container file over a network to a remote device. The method includes the step of accessing a container file, the container file comprising a plurality of components. The method also includes the step of transmitting metadata information for the plurality of components to the remote device. The method further includes the step of determining components from the plurality of components to transmit to the remote device. The method additionally includes the step of transmitting component data items for the determined components to the remote device.

Aspects may be implemented as a computer process, a computing system or as an article of manufacture such as a computer program product or computer readable media. The computer program product may be computer storage media readable by a computer system and encoding a computer program of instructions for executing a computer process.

DETAILED DESCRIPTION

Figure 1:
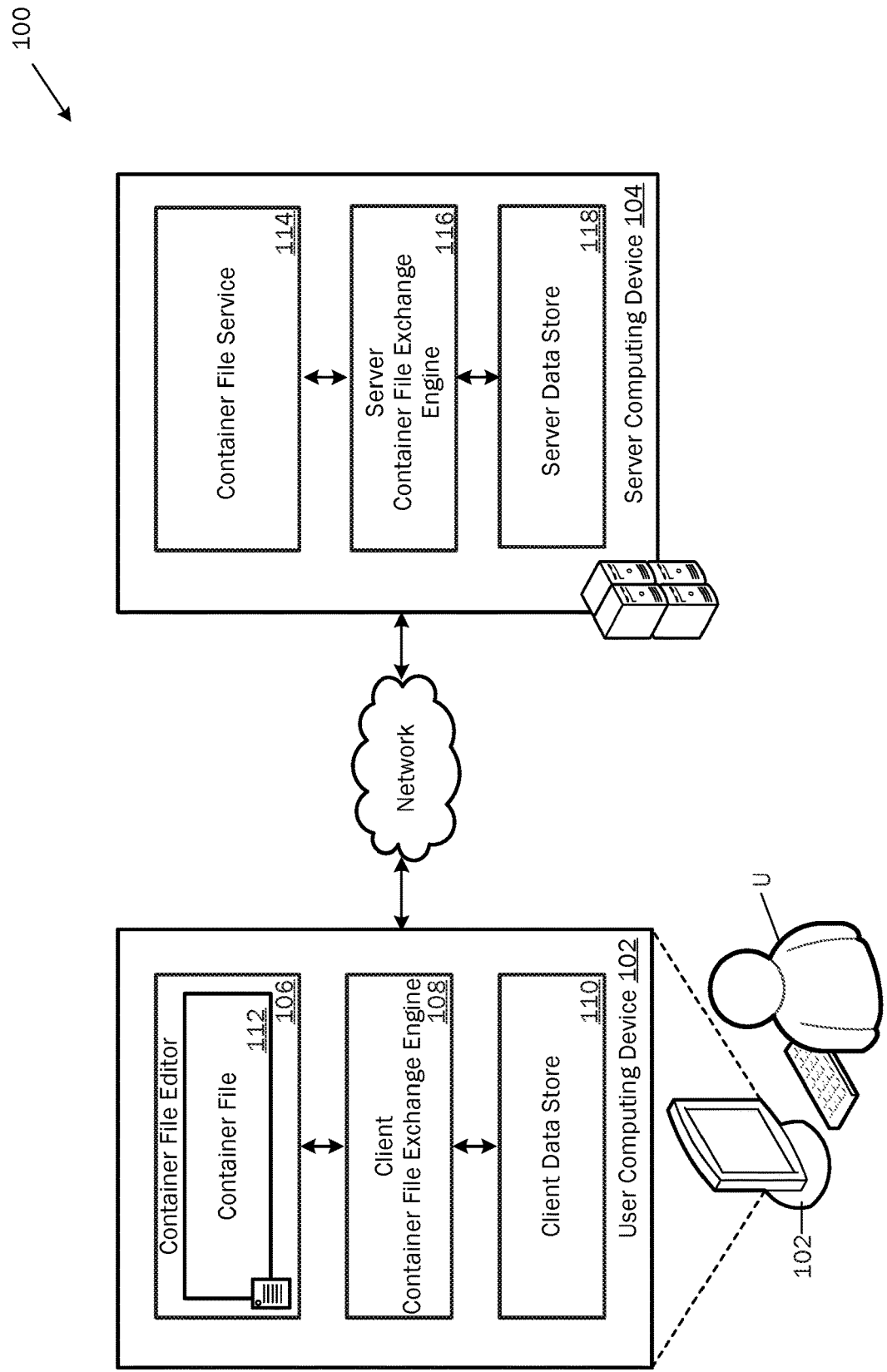
FIG. 1 is a block diagram of one example of a system for transferring container files.

Various aspects are described more fully below with reference to the accompanying drawings, which form a part hereof, and which show specific exemplary aspects. However, aspects may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

The present disclosure describes transferring files between computing devices. In some examples, the transferring is performed in a manner that minimizes the amount of data that must be transmitted to transfer the file. For example, in some aspects, a container file is transferred from a client computing device to a server computing device without transmitting all of the data associated with the components within the container file. For example, the client computing device may transmit to the server computing device metadata associated with all of the components within the container file and data associated with only a portion of the components in the container file. The client computing device may then determine which portion of the component data should be transferred based on determining which components the server computing device needs data. By transmitting the metadata associated with all of the components, the server computing device can determine the structure and contents of the container file that is being transferred. The metadata is typically small and can be transmitted relatively quickly. The data may be much larger than the metadata and by avoiding transmission of all of the data, the container file can be transferred more quickly.

The client computing device uses multiple techniques to determine which component data is needed by the server computing device. For example, in some aspects, the client computing device maintains a list of components that are cached on the server computing device and determines to send components that are not included in the list. The list may be indexed using a hash value that is calculated at least in part based on the content of the component data (e.g., a cyclic redundancy code), and thus when a component is modified, its hash value would change and the component would no longer be found in the list using the modified hash value. The list may include components that are common across many container files. The list may also include components that are specific to a particular container file and that have been previously transmitted to the server computing device by the client computing device. In some aspects, the client computing device maintains the list by adding components that have been transmitted to the server device to the list. Additionally, in some aspects, the client computing device maintains the list by adding components that have been transmitted to the server device after receiving a response from the server computing device indicating that the components have been added to a cache.

As another example, in some aspects, the client computing device determines that the server computing device needs component data based on a request for the component data sent by the server computing device. For example, the client computing device may transmit the metadata associated with all of the components to the server computing device. The server computing device may then determine which of the components are cached and which are not. Alternatively, the server computing device may begin to perform operations (e.g., loading the container file, analyzing or otherwise using the container file) without verifying that all components are available until the operations cannot proceed because a component is missing. Upon determining that at least some of the components are not cached, the server computing device may send a request for the components that are not cached to the client computing device. In response, the client computing device determines that the server computing device needs the requested components and transmits those requested components to the server computing device.

Although the examples herein typically relate to transferring container files from a client computing device to a server computing device, the technology disclosed is equally applicable to transferring container files from a server computing device to the client computing device. For example, a server computing device may transfer a modified version of a received container file to the client computing device that first sent the container file. Additionally, the disclosed technology can also be used for transferring container files from a client computing device to another client computing device such as for co-authoring and collaboration. Further, the disclosed technology can also be used for transferring container files from one server to another server.

FIG. 1 is a block diagram of one example of a system 100 for transferring container files. As illustrated in FIG. 1, the system 100 includes a user computing device 102 that is operable by a user U and a server computing device 104. The user computing device 102 and the server computing device 104 communicate over a network.

The user computing device 102 includes a container file editor 106, a client container file exchange engine 108, and a client data store 110. Although FIG. 1 illustrates the client container file exchange engine 108 and the client data store 110 as separate components, in some aspects, one or both of the client container file exchange engine 108 and the client data store 110 are integral with the container file editor 106.

In some aspects, the container file editor 106 is an application running on the user computing device 102 that is operable to create or edit container files such as a container file 112. Additionally, in some aspects, the container file editor 106 interacts with the server computing device 104. In some examples, the container file editor 106 is a browser application operable to generate interactive graphical user interfaces based on content served by a remote computing device such as the server computing device 104 or another computing device. According to an example, an extension is installed on the user computing device 102 as a plug-in or add-on to the browser application (i.e., container file editor 106) or is embedded in the browser application.

In an example, the container file editor 106 is a presentation editor that operates to generate, edit, and display presentations. The POWERPOINT® presentation graphics program from Microsoft Corporation of Redmond, Wash. is an example of a presentation editor. Other example presentation editors include the KEYNOTE® application program from Apple Inc. of Cupertino, Calif.; GOOGLE SLIDES from Google Inc. of Mountain View, Calif.; HAIKU DECK from Giant Thinkwell, Inc. of Seattle, Wash.; PREZI from Prezi, Inc. of San Francisco, Calif.; and EMAZE from Visual Software Systems Ltd. of Tel-Aviv, Israel. In these examples, the container file 112 may be a presentation file comprising one or more presentation spaces such as slides. The presentation spaces may include various elements such as images, media, text, charts, and graphics. In other examples, the container file editor 106 is a document editor such as the WORD document editor from Microsoft Corporation of Redmond, Wash. or a spreadsheet editor such as the EXCEL® spreadsheet editor, also from Microsoft Corporation.

The client container file exchange engine 108 operates to exchange (e.g., transmit or receive) container files with another computing device such as the server computing device 104. The client container file exchange engine 108 may interact with the container file editor 106 to receive requests to transmit or receive various container files. The client container file exchange engine 108 is illustrated and further described with respect to at least FIGS. 3, 5, and 6.

The client data store 110 operates to store container files, components of container files, and other data usable by the client container file exchange engine 108. The client data store 110 is illustrated and further described with respect to at least FIG. 4.

The server computing device 104 includes a container file service 114, a server container file exchange engine 116, and a server data store 118. Although FIG. 1 illustrates the server container file exchange engine 116 and the server data store 118 as being separate from the container file service 114, in some aspects, one or both of the server container file exchange engine 116 and the server data store 118 are integral with the container file service 114.

In some aspects, the container file service 114 operates to provide a service to client computing device such as the user computing device 102. The container file service 114 may comprise one or more applications that are run by the server computing device 104. Example services provided by aspects of the container file service 114 include file versioning and storage services such as those provided by ONE-DRIVE® cloud storage service from Microsoft Corporation of Redmond, Wash., collaboration and co-authoring services such as those provided by SHAREPOINT® team collaboration services also from Microsoft Corporation, and document design suggestion services.

For example, in some aspects, the container file service 114 operates to receive a presentation file from the user computing device 102. The container file service 114 then analyzes at least part of the presentation file and transmits to the user computing device 102 suggestions for the layout or design of portions of the container file 112. For example, the container file editor 106 may trigger a transmission of the container file 112 to the container file service 114 when an image is added to a slide in a presentation file. The container file service 114 may then analyze the image and the slide to provide design suggestions. Upon receiving the design suggestions, the client container file editor 106 may generate and present to the user U thumbnails based on the suggestions. The user U can make a selection and indicate to the container file editor 106 to apply the selected suggestion to the container file 112.

The server container file exchange engine 116 operates to exchange (e.g., transmit or receive) container files 112 with another computing device such as the user computing device 102. The server container file exchange engine 116 may interact with the container file service 114 to receive requests to transmit or receive various container files 112. The server container file exchange engine 116 may be similar to the client container file exchange engine 108 and is illustrated and further described with respect to at least FIGS. 3, 5, and 6.

The server data store 118 operates to store container files, components of container files, and other data usable by the server container file exchange engine 116. The server data store 118 may be similar to the client data store 110, and is illustrated and further described with respect to at least FIG. 4.

Figure 2:
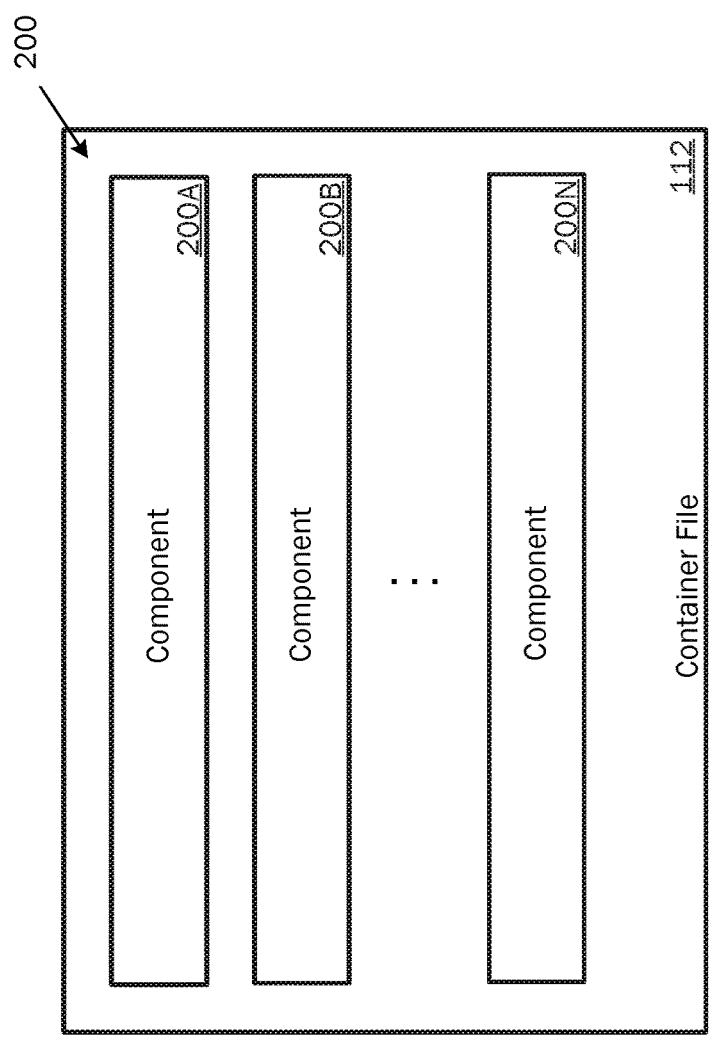
FIG. 2 provides a block diagram of an example of the container file of FIG. 1.

FIG. 2 provides a block diagram of an example of the container file 112. In this example, the container file 112 includes a plurality of components 200, such as components 200A-200N. The container file 112 may include any number of components 200. In some aspects, the components 200 represent separate files that can be extracted from the container file 112. The components 200 are examples of portions of the container file 112. Additionally, in some aspects, the container file 112 may include other components as well, such as a directory listing of the other components or metadata about the components 200. In some aspects, at least some of the components 200 are compressed. Further, in some aspects, at least some of the components 200 are container files 112.

The container file 112 may be a zipped file format. For example, the container file 112 may include a compressed directory that contains multiple individual component files. The individual component files may be of multiple different types, including but not limited to extensible markup language (XML) files, image files, and font files. These individual component files in a zipped file format container file 112 are examples of components of a container file 112. In some examples, the container file 112 is formatted with an Office Open XML File format, such as the Office Open XML Document format, (which will often have a .DOCX extension) the Office Open XML Presentation format (which will often have a .PPTX extension), or Office Open XML Workbook format (which will often have a .XLSX extension).

Figure 3:
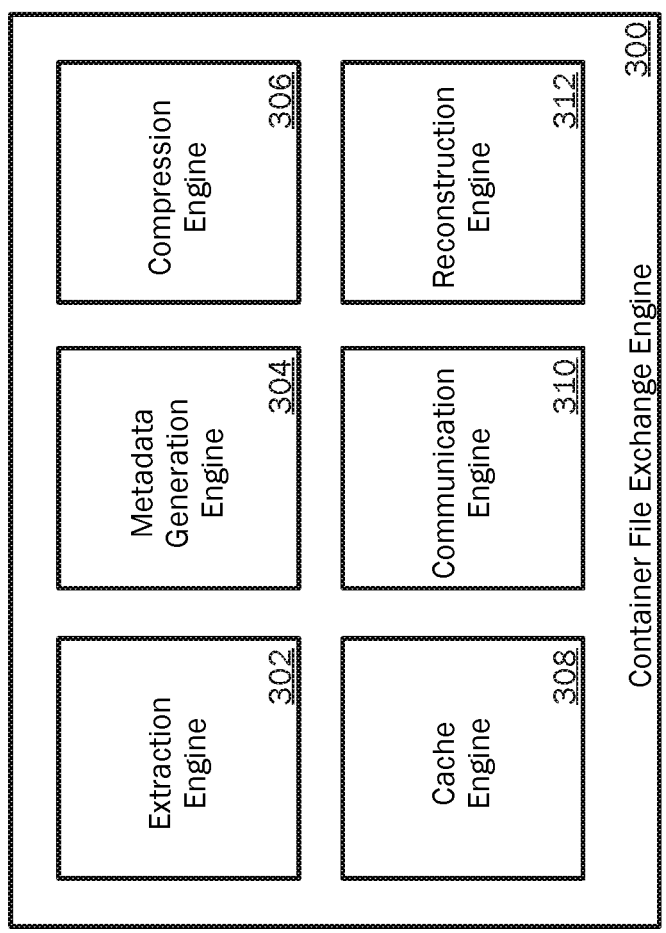
FIG. 3 illustrates an aspect of a container file exchange engine that may be used to implement aspects of the client container file exchange engine and the server container file exchange engine of FIG. 1.

FIG. 3 illustrates an aspect of a container file exchange engine 300 that may be used to implement aspects of the client container file exchange engine 108 and the server container file exchange engine 116. In some aspects, the container file exchange engine 300 includes an extraction engine 302, a metadata generation engine 304, a compression engine 306, a cache engine 308, a communication engine 310, and a reconstruction engine 312. Other aspects include fewer, additional, or different engines as well. For example, some aspects do not include the reconstruction engine 312 (e.g., an aspect that transmits but does not receive container files 112). As another example, some aspects do not include the extraction engine 302 and the metadata generation engine 304 (e.g., an aspect that receives but does not transmit container files).

The extraction engine 302 operates to extract components from a container file 112. For example, the extraction engine 302 may consult a directory of components that is stored in the container file 112 to determine the names of the components and the location (e.g., an offset into the container file 112) of data for the components within the container file 112. This directory may then be used to create separate files for the components. The directory may include path location information (e.g., a directory) that can be used to determine where the extracted component should be placed relative to other extracted components. The extracted components may be stored as separate files within one or more directories on a file system. Alternatively, the separate files may be generated within memory without necessarily being written to a file system. In some aspects, the extraction engine 302 may decompress the components as well.

The metadata generation engine 304 operates to generate metadata for a container file, including for the component files within the container file. In some aspects, the generated metadata includes individual metadata information files for the components. For example, the individual metadata information files may include a component name, an uncompressed size for the component, a compressed size for the component, and a fingerprint value for the compressed component. The fingerprint value comprises a relatively short data value (e.g., a bit string) for the comparatively large compressed component data that is likely to uniquely identify the compressed component data (i.e., the fingerprint is different for different or changed components). In some aspects, the fingerprint value is generated using a hash function such as a cyclic redundancy code. In some aspects, some or all of the components are not compressed and accordingly the metadata information files may not include a compressed size for the components.

The compression engine 306 operates to compress the components. Additionally, in some aspects, the compression engine 306 operates to compress the container file 112 as a whole. In at least some aspects, the compression engine 306 applies a reversible compression algorithm that removes data redundancy or otherwise allows a component to be represented using less data than was originally used to represent the component.

In some aspects, the cache engine 308 operates to manage a cache of components. For example, in some aspects, the cache engine 308 manages a cache for a computing device that includes the container file exchange engine 300. Additionally, in some aspects, the cache engine 308 operates to manage at least one remote cache index. For example, the remote cache index may include an index of the components that are stored in a cache of another computing device. For example, using the remote cache index, the cache engine 308 can determine whether a particular component is currently stored in the remote cache and thus whether it is necessary to transmit that component to the remote computing device. In some aspects, the cache engine 308 uses a hash value to index the components. For example, the hash value may be generated using a fingerprint of the component as well as other values, such as an uncompressed size and a compressed size of the component. The hash value may then be used to determine whether a particular component is available in the local cache or in a remote cache.

The communication engine 310 operates to transmit and receive data related to container files 112 and components over the network. In some aspects, the communication engine 310 operates to transmit to a remote computing device the component metadata generated by the metadata generation engine 304 and component data for the components that are not determined to be cached by the remote computing device. Further, some aspects of the communication engine 310 operate to receive from a remote computing device component metadata and potentially at least some component data. Additionally, in some aspects, the communication engine 310 is configured to send and receive requests for component data (e.g., for components that have not been sent and cannot be retrieved from the cache).

The reconstruction engine 312 operates to reconstruct a container file 112 that has been received by the communication engine 310. In some aspects, the reconstruction engine 312 uses the received component metadata to reconstruct a container file 112. Based on the component metadata, the reconstruction engine 312 may operate to combine component data that have been received from a remote computing device and component data that has been retrieved from the cache. In some aspects, the container file 112 is reconstructed and written into a storage drive. Additionally or alternatively, the contents of the container file 112 are loaded and used within an application such as the container file editor 106 or a service such as the container file service 114.

Figure 4:
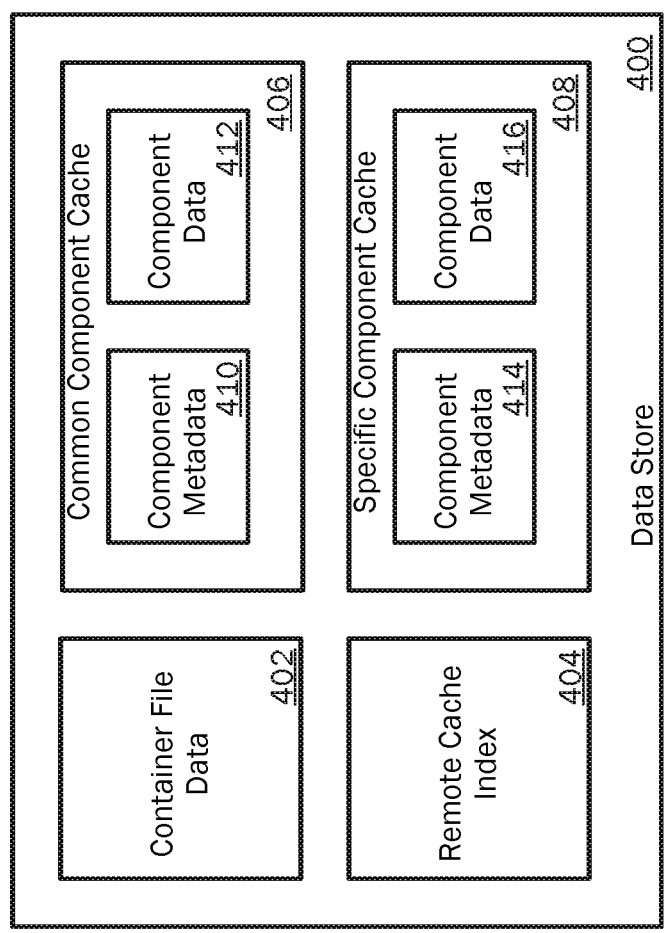
FIG. 4 illustrates an aspect of a data store that may be used to implement aspects of the client data store and the server data store of FIG. 1.

FIG. 4 illustrates an aspect of a data store 400 that may be used to implement aspects of the client data store 110 and the server data store 118. In some aspects, the data store 400 includes container file data 402, remote cache index 404, common component cache 406, and specific component cache 408. Other aspects include fewer, additional, or different data as well.

In some aspects, the container file data 402 includes container files 112 that are being received or that have been reconstructed using received data. For example, when a container file 112 is being received, the container file data 402 may comprise a plurality of component metadata and component data. Additionally, the container file data 402 may comprise references to cached component data.

The remote cache index 404 comprises one or more cache indexes corresponding to components that are cached at a remote computing device. For example, the client data store 110 may include an index of at least some of the data cached in the server data store 118, while the server data store 118 may include an index of at least some of the data cached in the client data store 110. Additionally, the remote cache index 404 may include multiple cache indexes if the data store 400 is being used for communication with multiple remote computing devices such as is often the case for at least the server computing device 104. In some aspects, the remote cache index 404 may comprise a table containing at least two columns. One column includes an identifier of a remote computing device and the other column includes a hash value of a component data item. To determine whether a component data item appears in the remote cache index for a particular remote computing device, the table is queried for records that match both the identifier of the remote computing device and the hash value for the component data item. If a matching record is found, it is determined that the component data item is cached for a particular remote computing device and consequently that the component data item need not be transmitted to the remote computing device.

The common component cache 406 operates to cache components that are commonly used across many container files 112. For example, in presentation files, the common component cache 406 may operate to cache commonly used fonts and background images. In some aspects, the common component cache 406 includes component metadata 410 and component data 412. The component metadata 410 may include component metadata records comprising component metadata for each of the cached common components. The component metadata records may include rows in a table in a relational database and/or files. The component metadata records may include various metadata relating to each component such as a name, an uncompressed size, a compressed size, and a fingerprint value. Additionally, in some aspects, the component metadata 410 also includes a hash value that is separate from the fingerprint for the component, which may be calculated using at least some of the information from the metadata information files. Each component metadata record may also include a reference to a component data item in the component data 412. The component data items may comprise records in a table in a database and/or files stored in a file system.

The specific component cache 408 operates to cache components that have been received from other computing devices. The specific component cache 408 may be similar to the common component cache 406. In some aspects, the common component cache includes component metadata 414 and component data 416, which may be similar to the previously described component metadata 410 and component data 412, respectively. Additionally, in some aspects, the specific component cache 408 may include information that associates records in the component metadata 414 or component data 416 with a particular remote machine or session. For example, using this additional information, records may be removed from the specific component cache 408 upon termination of a session.

Figure 5:
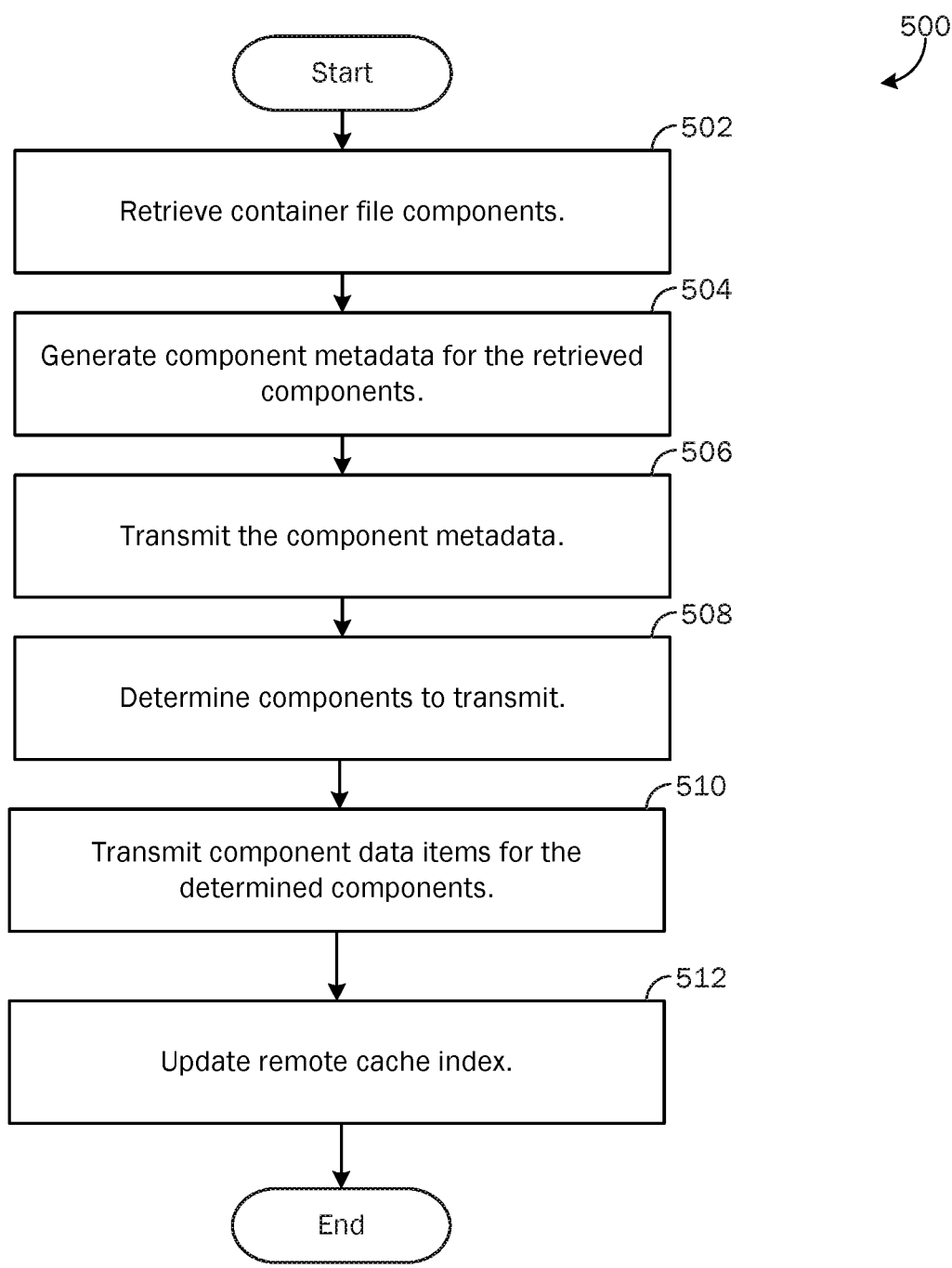
FIG. 5 illustrates a method for transferring a container file that may be performed by aspects of the system of FIG. 1.

FIG. 5 illustrates a method 500 for transferring a container file 112. As an example, the method 500 may be executed by a component of an exemplary system such as the system 100. For example, the method 500 may be performed by the client container file exchange engine 108 to transfer a container file to the server computing device 104 or by the server container file exchange engine 116 to transfer a container file to the user computing device 102. In examples, the method 500 may be executed on a device comprising at least one processor configured to store and execute operations, programs, or instructions.

At operation 502, container file components are retrieved. For example, in some aspects, the extraction engine 302 accesses a stored container file and extracts the components from the container file. Alternatively, the extraction engine 302 may access a container file 112 that has been loaded by an application or service such as the container file editor 106 or the container file service 114. In some aspects, some or all of the components have been previously extracted from the container file 112 and loaded into an application/service such as the container file editor 106 or the container file service 114. In this case, the components may be retrieved from a memory space or temporary storage of the application/service.

At operation 504, component metadata is generated for the retrieved components. For example, component metadata information files may be generated for each of the components. The component metadata may include various information such as a component name, component uncompressed size, component compressed size, and component fingerprint. The data included in the component metadata may be extracted from the container file 112, such as from header data associated with the components. Alternatively, the data may be generated while preparing component data items for possible transmission.

At operation 506, the component metadata is transmitted. For example, the component metadata may be transmitted to a remote computing device. In some aspects, the component metadata is transmitted as a plurality of component metadata information files in which each file corresponds to a single component. Additionally or alternatively, the component metadata is transmitted in one or more aggregated groups in which the aggregated groups may contain the metadata for multiple components.

At operation 508, it is determined which components to transmit. In some aspects, this determination of which components to transmit is based on whether the components appear to be cached by the remote computing device. In some aspects, a hash value associated with the component metadata is used to query a remote cache index 404 to determine whether the remote computing device has cached the component. Additionally, in some aspects, the common component cache 406 is stored locally and is queried to determine whether a component is likely to be stored in a separate common component cache 406 on the remote computing device. Additionally or alternatively, the determination of which components to transmit can be made based on requests from the remote computing device. These requests can serve as a failsafe if it is incorrectly determined that a component need not be sent to a remote computing device. Additionally, in some aspects, it is initially determined that none of the components should be transmitted. Then, the subsequent requests from the remote computing device are used to determine which components to transmit.

At operation 510, component data items for the determined components are transmitted to the remote computing device. In some aspects, the component data items are transmitted individually (e.g., as individual component data files containing a component data item for a single component). In other aspects, the component data items are aggregated into one or more groups for transmission. Additionally, in some aspects, the component data items are compressed before being transmitted.

In at least some aspects, operations 508 and 510 may be performed multiple times in the transmission of a single container file 112. For example, operation 508 may make an initial determination of which components need to be transmitted. Then operation 510 may transmit those determined components. Thereafter, operation 508 may be repeated to determine additional components to transmit based on, for example, requests received from the remote computing device. Then operation 510 may be performed again to transmit these determined additional components.

At operation 512, the remote cache index 404 is updated. In some aspects, the remote cache index 404 is updated to include all of the components that were transmitted to the remote computing device. In other aspects, a list is received from the remote computing device that identifies the components that have been added to the cache on the remote computing device. In these aspects, the remote cache index is updated to include the components the remote computing device has acknowledged adding to its cache.

Additionally, in some aspects of the method 500, at least some of the components are cached. For example, the components that are not currently in the common component cache 406 or the specific component cache 408 may be added to the specific component cache 408. In this manner, these components will be cached for use in reassembly of a container file that is later transferred to the computing device that is performing the method 500. For example, in some aspects, the remote computing device that receives the container file 112 will modify and return the container file 112. In this case, the returned container file 112 is likely to have many components that are identical to the components of the container file 112 that was initially transferred.

Additionally, in some aspects, the container file exchange engine 300 determines whether to perform the method 500 based on properties of the remote computing device. For example, the method 500 may only be performed if it can be determined that the remote computing device supports a method of receiving container files 112 that is compatible with the method 500. Additionally, in some aspects, other properties of the remote computing device are evaluated to determine whether to perform the method 500, such as the location of the remote computing device, the identity of the hosting entity, and the services to which the client is subscribed.

Figure 6:
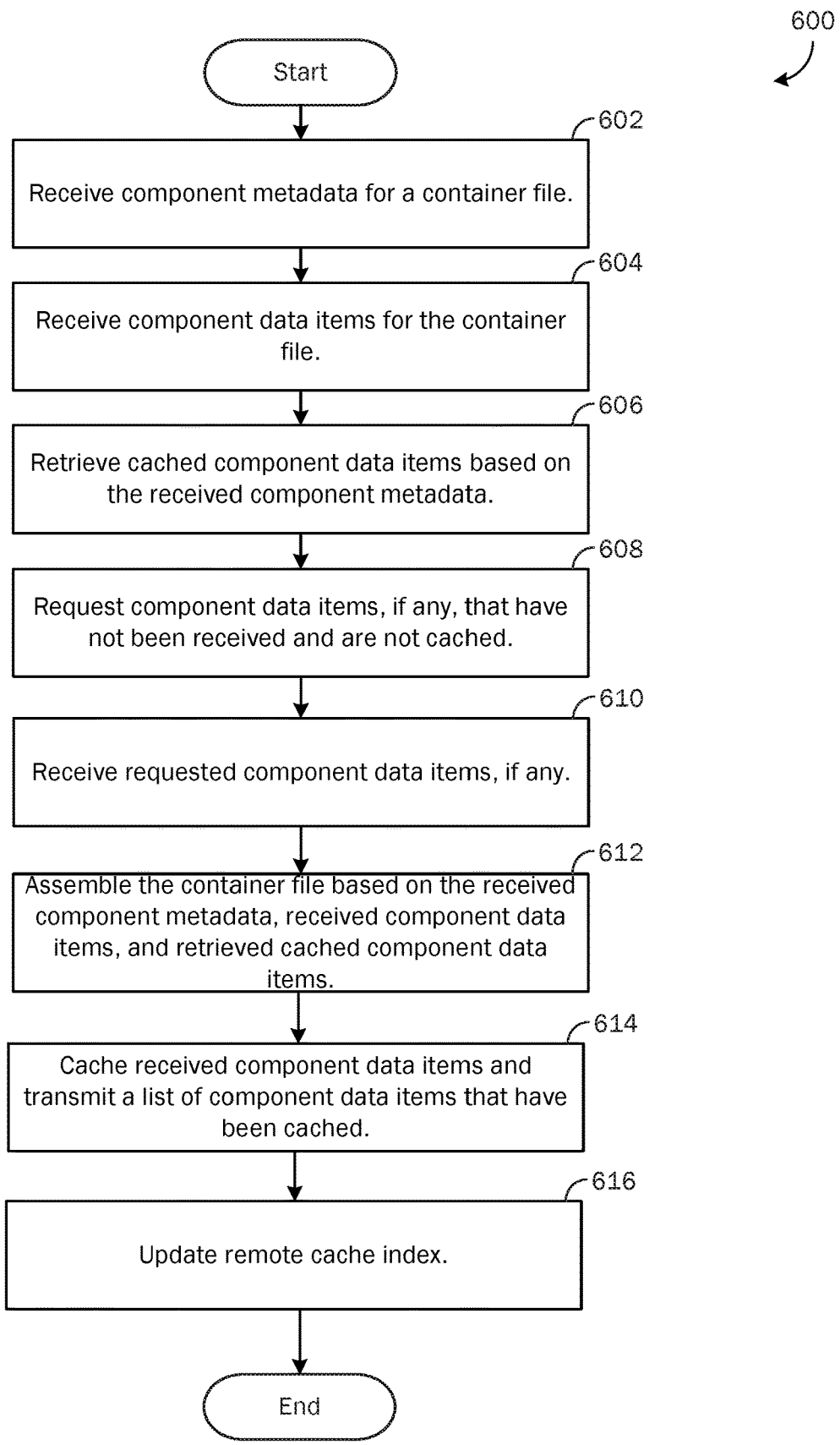
FIG. 6 illustrates a method for receiving a container file that may be performed by aspects of the system of FIG. 1.

FIG. 6 illustrates a method 600 for receiving a container file. As an example, the method 600 may be executed by a component of an exemplary system such as the system 100. For example, the method 600 may be performed by the server container file exchange engine 116 to receive a container file from the user computing device 102 or by the client container file exchange engine 108 to receive a container file 112 from the server computing device 104. In examples, the method 600 may be executed on a device comprising at least one processor configured to store and execute operations, programs, or instructions.

At operation 602, component metadata is received for a container file 112. The component metadata may be retrieved, for example, from a remote computing device. In some aspects, the received component metadata may comprise component metadata information files for a plurality of components within a container file 112.

At operation 604, component data items are received for the components of the container file 112. In some aspects, component data items for all, some, or none of the components of the container file 112 are received.

At operation 606, cached component data items are retrieved based on the received component metadata. The cached component data items may be retrieved from the common component cache 406 and the specific component cache 408. In some aspects, it is determined whether the component data items are available in either the common component cache 406 or the specific component cache 408 using a hash value generated from the component metadata for the components. For example, some aspects, query tables in the common component cache 406 and the specific component cache 408 for records that match a hash value calculated from the component metadata. If the query returns a matching record, it is determined that component data item for the component is cached and the component data item is retrieved. In at least some aspects, if a component data item was received in operation 604 for a component, it is not determined whether the component data item has been cached.

At operation 608, a request is transmitted to the remote computing device for the component data items, if any, that were not received in operation 604 and that were also not retrieved from the cache in operation 606. In some aspects, the request may comprise a plurality of component metadata items or a hash value calculated from the component metadata for the components that are still needed. Thereafter, at operation 610, the requested component data items, if any, are received.

At operation 612, the container file 112 is assembled based on the received component metadata, the received component data items, and the retrieved cached component data items. In some aspects, the assembly may comprise uncompressing any compressed component data items and associating the uncompressed component data items with a name and/or path information from the component metadata. Additionally, the components may be written to a file according to the particulars of the container file format. Additionally or alternatively, the components may be loaded by, for example, the container file editor 106 or the container file service 114.

At operation 614, the received component data items are cached. In some aspects, any of the received component data items that were not already cached are added to the specific component cache 408. Additionally, in some aspects, a list of component data items that have been added to the cache is transmitted to the remote computing device so that the remote computing device can maintain/update a remote cache index.

At operation 616, the remote cache index 404 is updated. In some aspects, the remote cache index 404 is updated to include all of the component data items that were received from the remote computing device.

Figure 7:
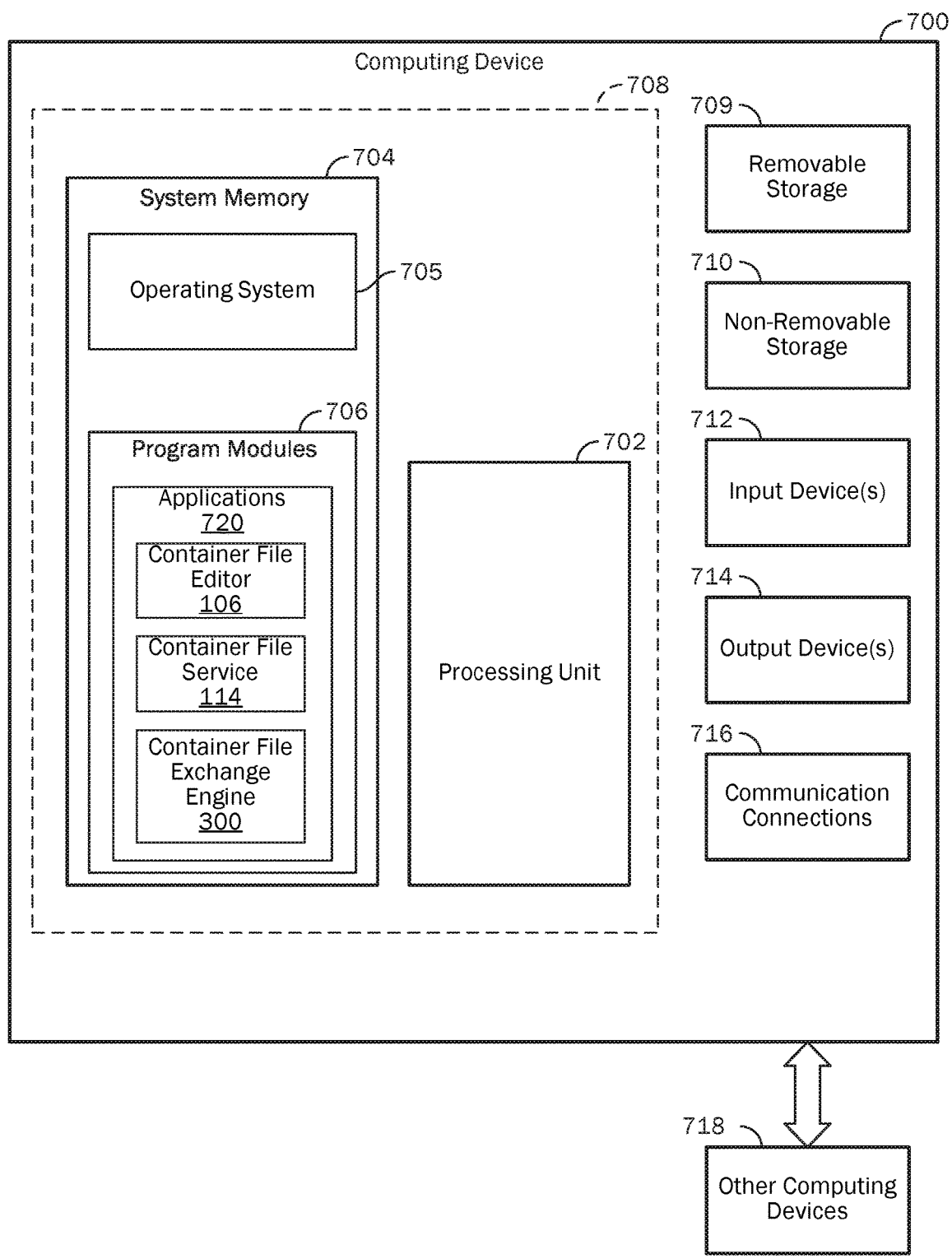
FIG. 7 is a block diagram illustrating example physical components of a computing device with which aspects of the invention may be practiced.
Figure 8A:
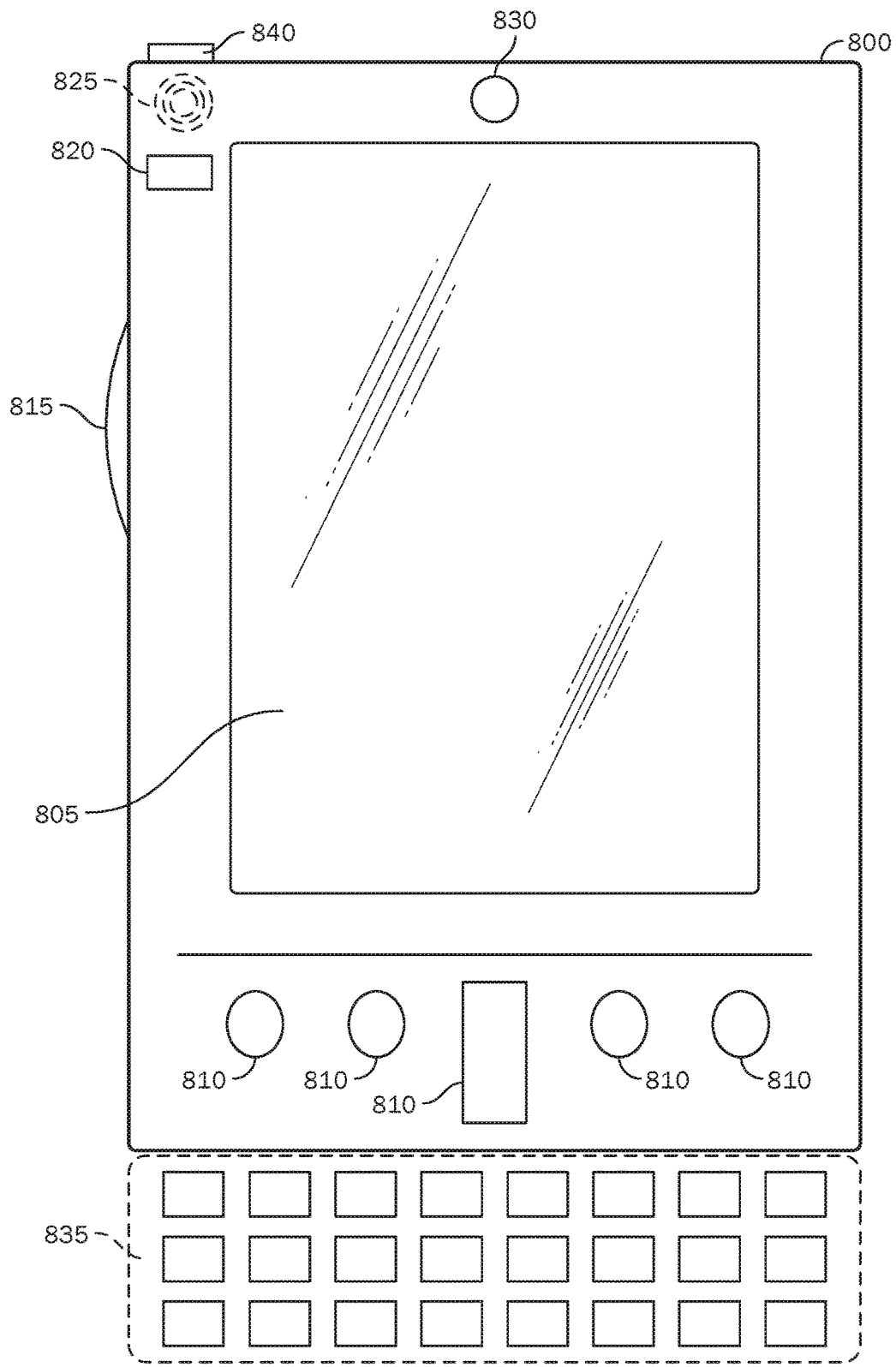
FIGS. 8A and 8B are block diagrams of a mobile computing device with which aspects of the present invention may be practiced.
Figure 8B:
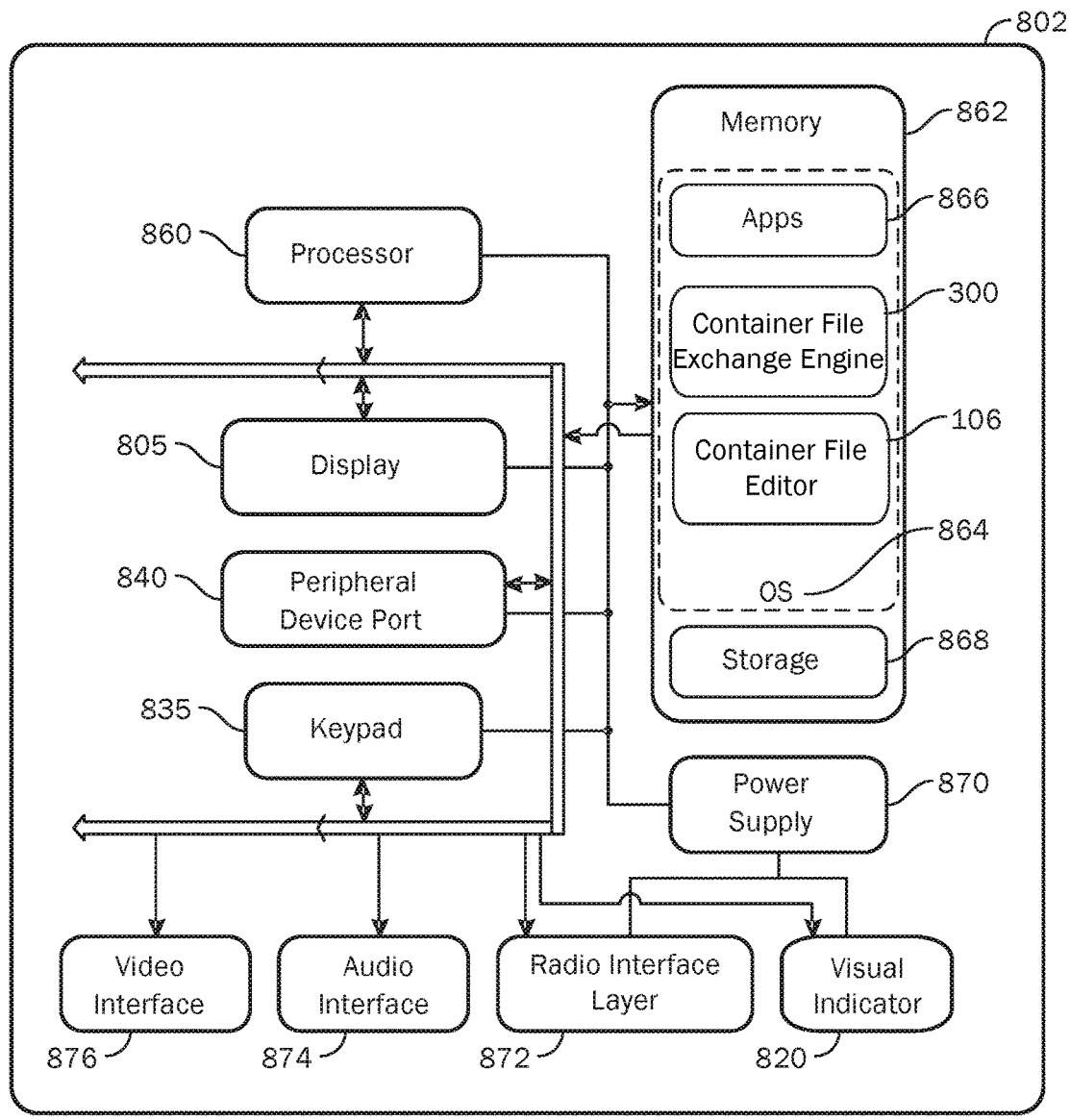
Figure 9:
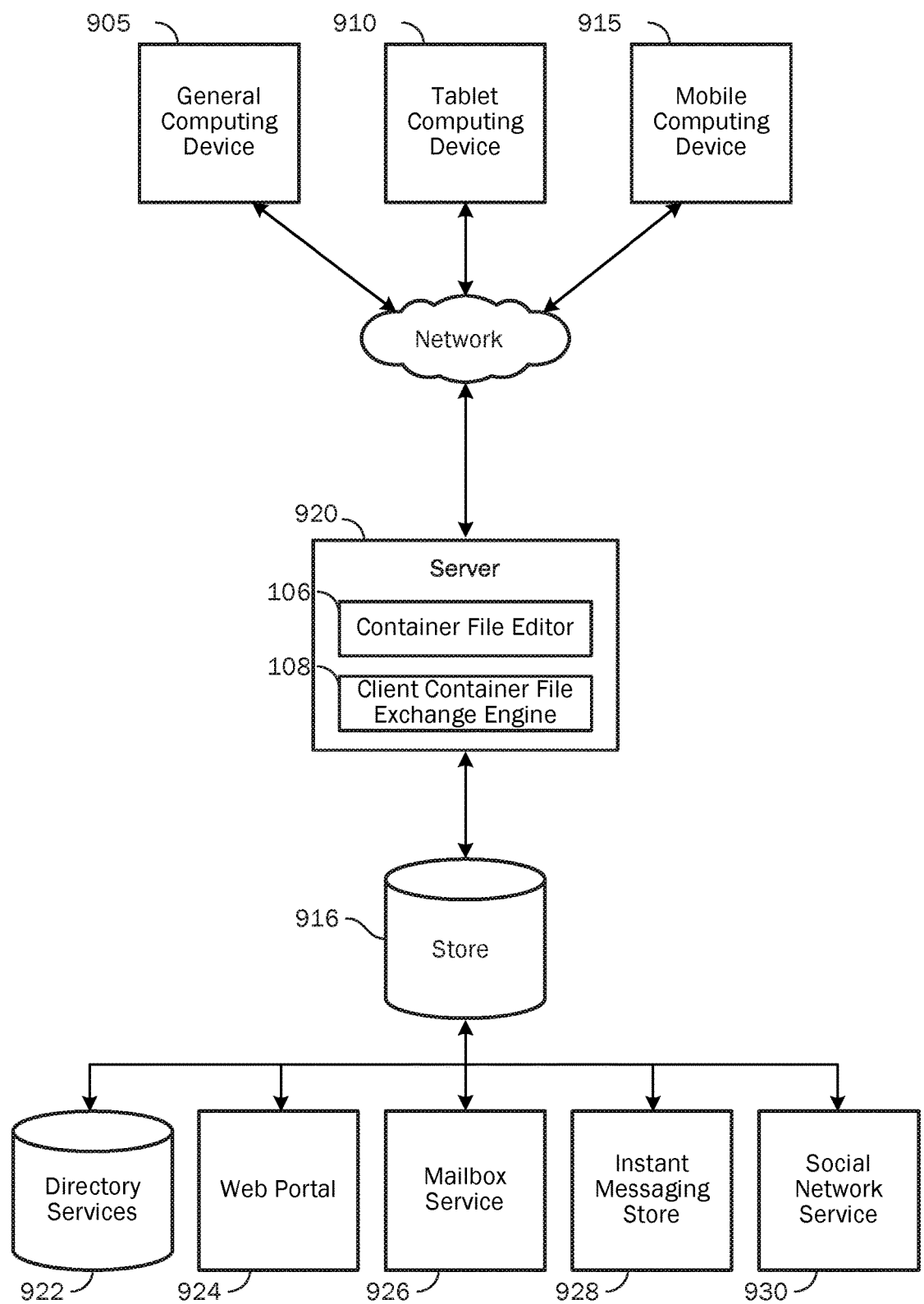
FIG. 9 is a block diagram of a distributed computing system in which aspects of the present invention may be practiced.

FIGS. 7-9 and the associated descriptions provide a discussion of a variety of operating environments in which aspects of the invention may be practiced. However, the devices and systems illustrated and discussed with respect to FIGS. 7-9 are for purposes of example and illustration and are not limiting of a vast number of computing device configurations that may be used for practicing aspects of the invention, described herein.

FIG. 7 is a block diagram illustrating physical components (i.e., hardware) of a computing device 700 with which aspects of the invention may be practiced. The computing device components described below may be suitable for the user computing device 102 and the server computing device 104. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 720 such as the container file editor 106, the container file service 114, and the container file exchange engine 300. The operating system 705, for example, may be suitable for controlling the operation of the computing device 700. Furthermore, aspects of the invention may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., the container file exchange engine 300) may perform processes including, but not limited to, one or more of the stages of the methods 500-600 illustrated in FIGS. 5-6. Other program modules that may be used in accordance with aspects of the present invention may include electronic mail and contacts applications, word processing applications, spreadsheet applications, database applications, slide presentation applications, drawing or computer-aided application programs, etc.

Furthermore, aspects of the invention may be practiced in an electrical circuit comprising discrete electronic elements, packaged or integrated electronic chips containing logic gates, a circuit utilizing a microprocessor, or on a single chip containing electronic elements or microprocessors. For example, aspects of the invention may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the container file exchange engine 300 may be operated via application-specific logic integrated with other components of the computing device 700 on the single integrated circuit (chip). Aspects of the invention may also be practiced using other technologies capable of performing logical operations such as, for example, AND, OR, and NOT, including but not limited to mechanical, optical, fluidic, and quantum technologies. In addition, aspects of the invention may be practiced within a general purpose computer or in any other circuits or systems.

The computing device 700 may also have one or more input device(s) 712 such as a keyboard, a mouse, a pen, a sound input device, a touch input device, etc. The output device(s) 714 such as a display, speakers, a printer, etc. may also be included. The aforementioned devices are examples and others may be used. The computing device 700 may include one or more communication connections 716 allowing communications with other computing devices 718.

Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a mobile computing device 800, for example, a mobile telephone, a smart phone, a tablet personal computer, a laptop computer, and the like, with which aspects of the invention may be practiced. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output peripheral device ports 840, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (i.e., an architecture) 802 to implement some aspects. In one aspect, the system 802 is implemented as a "smart phone" capable of running one or more applications (e.g., browsers, e-mail applications, calendaring applications, contact managers, messaging clients, games, and media clients/players). In some aspects, the system 802 is integrated as a computing device, such as an integrated personal digital assistant (PDA) and wireless phone.

The system includes a processor 860. One or more application programs 866 may be loaded into the memory 862 and run on or in association with the operating system 864 using the processor 860. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. As should be appreciated, other applications may be loaded into the memory 862 and run on the mobile computing device 800, including the container file editor 106 and the container file exchange engine 300 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 866 via the operating system 864, and vice versa.

The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. The system 802 may further include a video interface 876 that enables an operation of an on-board camera 830 to record still images, video streams, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

FIG. 9 illustrates one aspect of the architecture of a system for transferring container files, as described above. Container files developed, interacted with, or edited in association with the container file editor 106 or transferred in association with the client container file exchange engine 108 may be stored in different communication channels or other storage types. For example, various container files 112 may be stored using a directory service 922, a web portal 924, a mailbox service 926, an instant messaging store 928, or a social networking service 930. The client container file exchange engine 108 may use any of these types of systems or the like for transferring container files, as described herein. A server 920 may provide the container file editor 106 and the client container file exchange engine 108 to clients. As one example, the server 920 may be a web server providing the container file editor 106 over the web. The server 920 may provide the container file editor 106 or the client container file exchange engine 108 over the web to clients through a network. By way of example, the client computing device may be implemented as the computing device 700 and embodied in a personal computer 905, a tablet computing device 910, and/or a mobile computing device 915 (e.g., a smart phone). Any of these aspects of the client computing device 905, 910, 915 may use the container file editor 106 to interact with container files 112 stored in the store 916 as well as the client container file exchange engine 108 to transfer container files 112 stored in the store 916.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed invention.

We claim:

1. A system for transferring a container file over a network to a remote device, the system comprising:
   at least one processor; and
   memory, operatively connected to the at least one processor and storing:
      a container editor application; and
      instructions that, when executed by the at least one processor, cause the at least one processor to perform a method comprising:
         loading a container file using the container editor application, the container file comprising a plurality of component files;
         obtaining the plurality of component files from the container file;
         transmitting metadata information for each component file in the plurality of component files to the remote device; and
         based on a determination that one or more component files in the plurality of component files are not available to the remote device, transmitting component data for the determined one or more component files to the remote device.

2. The system of claim 1, further comprising instructions for generating metadata information for each component file in the plurality of component files, wherein the metadata information for each component file comprises a component file name, size information for the component file, and a fingerprint value for the component file.

3. The system of claim 2, wherein the size information comprises at least one of an uncompressed size for the component file and a compressed size for the component file.

4. The system of claim 2, wherein the fingerprint value for the component file comprises a cyclic redundancy code calculated on the component file.

5. The system of claim 1, further comprising instructions for determining, prior to transmitting the component data to the remote device, whether each component file in the plurality of component files is available to the remote device, the determining comprising:
   querying a remote cache index at the remote device to determine whether each component file in the plurality of component files is identified in the remote cache index as being available to the remote device; and
   determining to transmit the one or more component files in the plurality of component files to the remote device based on the one or more component files not identified in the remote cache index as being available to the remote device.

6. The system of claim 5, wherein:
   the remote cache index stores a first hash value for each component file available to the remote device, the first hash value generated based on data associated with the component file; and
   the system further comprises instructions for:
      transmitting a query to the remote device that includes a second hash value for a respective component file in the plurality of component files; and
      receiving, from the remote device, a response that indicates whether the respective component file is available to the remote device, the response based on a determination of whether the second hash value matches the first hash value.

7. The system of claim 6, wherein:
the remote cache index stores with each first hash value a first identifier of the remote device;
the query includes the second hash value and a second identifier of the remote device; and
the response from the remote device indicating whether the respective component file is available to the remote device is based on a determination of whether the second hash value matches the first hash value and the second identifier matches the first identifier.

8. The system of claim 5, further comprising instructions for updating the remote cache index based on the transmitted component data.

9. The system of claim 1, further comprising instructions for:
determining, prior to transmitting the component data to the remote device, whether each component file in the plurality of component files is not available to the remote device, the determining comprising receiving a request from the remote device for component data for at least one component file in the plurality of component files.

10. The system of claim 1, further comprising instructions for determining, prior to transmitting the component data to the remote device, which component files in the plurality of component files is not available to the remote device, the determining comprising:
searching a common component index for one or more component files in the plurality of component files, wherein the common component index comprises component files identified as being usable in multiple container files; and
determining to transmit the respective component file to the remote device based on the search of the common component index.

11. The system of claim 1, wherein:
the container file comprises a presentation file;
the container editor application comprises a presentation application; and
loading the container file comprises loading the presentation file using the presentation application.

12. A method of transferring a container file over a network to a remote device, the method comprising:
accessing a container file, using a container editor application, to obtain a plurality of component files and a directory listing of the plurality of component files;
generating, by a processor, metadata information for the plurality of component files based on the directory and header data extracted from the plurality of component files;
transmitting the metadata information for the plurality of component files to the remote device for use in reconstructing the container file on the remote device; and
based on a determination that one or more component files in the plurality of component files is not stored on the remote device, transmitting component data for the one or more component files to the remote device.

13. The method of claim 12, further comprising prior to accessing the container file, receiving a request from the remote device for component data for at least one component file in the plurality of component files.

14. The method of claim 12, wherein:
the metadata information comprises first metadata information;
the container file comprises a first container file; and
the method further comprises:
storing, at the remote device, component data for at least one of the plurality of component files in a component data cache;
receiving, at the remote device, second metadata information for a second plurality of component files in a second container file;
reconstructing, at the remote device, the second container file, wherein the second container file is reconstructed based on the received second metadata information and at least some of the component data stored in the component data cache.

15. The method of claim 14, wherein the second container file comprises a version of the first container file that has been revised on the remote device.

16. The method of claim 14, wherein reconstructing the second container file further comprises using the received second metadata information to determine whether component data for a component file of the second plurality of component files is stored in the component data cache.

17. The method of claim 16, wherein:
reconstructing the second container file further comprises comparing a second fingerprint value for a component file of the second plurality of component files to a first fingerprint value for component data stored in the component data cache; and
based on a determination that the second fingerprint value matches the first fingerprint value, determining that component data for the component file of the second plurality of component data files is stored in the component data cache.

18. A system for transferring a container file over a network to a remote device, the system comprising:
at least one processor; and
memory, operatively connected to the at least one processor and storing instructions that, when executed by the at least processor, cause the at least one processor to perform operations comprising:
loading a presentation container file using a presentation editor, the presentation container file comprising a plurality of component files and a directory listing of the plurality of component files;
generating, by the at least one processor, metadata information for the plurality of component files based on the directory and header data extracted from the plurality of component files, the header data comprising a name, size information for the component file, and a fingerprint value for the data of the component file;
transmitting the metadata information for the plurality of component files to the remote device for use in reconstructing the presentation container file on the remote device;
determining one or more component files in the plurality of component files not stored on the remote device; and
transmitting component data for the determined one or more component files to the remote device.

19. The system of claim 18, wherein determining the one or more component files not stored on the remote device comprises:
querying a remote cache index at the remote device to determine which component files in the plurality of component files are identified in the remote cache index as being stored on the remote device; and determining to transmit the one or more component files in the plurality of component files to the remote device based on the one or more component files not identified in the remote cache index as being stored on the remote device.

20. The system of claim 1, further comprising instructions for: determining, prior to transmitting the component data to the remote device, which component files in the plurality of component files is not available to the remote device, the determining comprising:

accessing a list that is received from the remote device to determine which component files in the plurality of component files is available to the remote device; and determining to transmit the one or more component files in the plurality of component files based on a determination that the one or more component files are not included in the list.

* * * * *